Patented Dec. 21, 1937

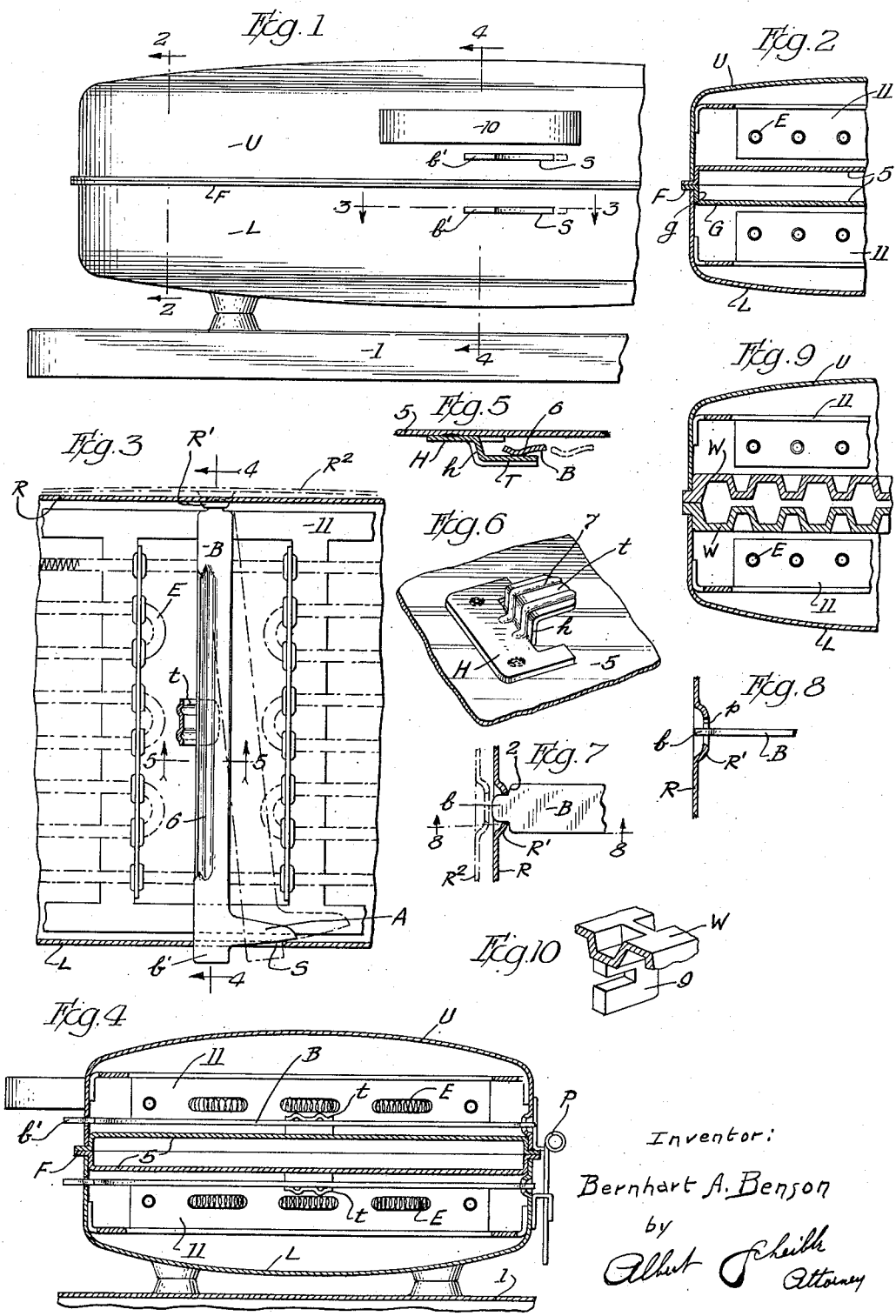

2,102,879

UNITED STATES PATENT OFFICE 2,102,879

SANDWICH TOASTER WITH INTERCHANGEABLE GRIDS

Bernhart A. Benson, Chicago, Ill., assignor to Chicago Electric Manufacturing Company, Chicago, Ill., a corporation of Illinois Application November 27, 1936, Serial No. 112,898

16 Claims. (Cl. 53—10)

My invention relates to an electric toasting or baking appliance, particularly suitable for household use, and in its general objects aims to provide an appliance of this class which can readily be used either as a sandwich toaster or as a waffle iron, and which will permit the user to effect this interchangeability speedily and without requiring any tools for so doing.

More particularly, my invention aims to provide an appliance of this class in which each grid, although manually detachable, is rigidly latched to the casing; in which the latching and unlatching of the grid can instantly be effected by a mere digital movement of a simple element, and in which the providing of such a latching provision will not materially affect the appearance of the appliance or the manufacturing cost of the appliance.

Furthermore, my invention aims to provide an appliance of this class in which the releasable latching provisions can be operatively central with respect to the grid and the casing section spanned by that grid, so that the grid will be pressed equally against all portions of the mouth end of that casing section; and in which the providing of such latching provisions will not interfere with an adequate distribution of the effect on the grid of the heating unit of the appliance.

Moreover, my invention aims to provide an exceedingly simple grid-latching provision which will require no auxiliary elements for supporting and guiding of the needed latching member, or for limiting the movements of this member.

Illustrative of the manner in which I accomplish the objects of my invention,

Fig. 1 is a fragmentary front elevation of an appliance embodying my invention.

Fig. 2 is a fragmentary vertical section, taken along the line 2—2 of Fig. 1 with sandwich-toasting grids in the casing sections.

Fig. 3 is a fragmentary plan section taken along the line 3—3 of Fig. 1.

Fig. 4 is a transverse vertical section through the same appliance, taken along the line 4—4 of Figs. 1 and 3.

Fig. 5 is a fragmentary vertical section, taken transversely of the latch arm along the line 5—5 of Fig. 4, showing the latching member both in its grid-clamping and in its grid-releasing position.

Fig. 6 is an inverted perspective view of the central portion of the lower grid and of the hook member attached to this grid.

Fig. 7 is an enlarged horizontal section through a portion of the rearward casing side, taken along the upper face of the latch arm and showing the supporting of the rear end of this arm, and Fig. 8 is a vertical section through the same parts.

Fig. 9 is a fragmentary section similar to Fig. 2 but taken when a waffle grid is in each casing section.

Fig. 10 is a perspective view of the central portion of a waffle grid, showing the use of an integral hook in place of the separately formed hook member in Fig. 6.

In the illustrated embodiment, my appliance, includes an upwardly open and box-like lower casing member L, desirably of rectangular horizontal section, mounted on the usual base I. This lower casing member is connected at the upper edge of its rear side by a hinge P (Fig. 4) to an upper casing section U of counterpart horizontal cross-section but inverted so that the mouths of the two sections face each other.

Slidably fitted to the mouth end of each section, as shown in Figs. 2 and 4, is a tray-like sandwich toasting grid, comprising a flat bottom G, a riser wall g slidably fitting into the riser wall portion of the section and a peripheral flange F which seats on the mouth end of the casing section to limit the inserting of the grid into that section.

To retain each grid in its above recited disposition, in which the grid effectively spans the mouth end of one of the casing sections, I equip each grid with a hook extending into the space between the grid bottom and the box-bottom of the casing section with which that grid is associated. For use on a sheet metal grid G, this hook member desirably is a sheet metal stamping, formed as shown in the inverted view of Fig. 6, namely with a base H welded to the grid bottom, a riser shank $h$ extending at right angles to this base, and a tongue $t$ extending substantially parallel to the grid bottom and longitudinally of the grid.

In each casing section I also provide a horizontal latch bar B which extends transversely of that section, which bar has a narrowed rear end portion $b$ projecting through a perforation $p$ in the rear side R of the casing section, and which bar has its forward end portion $b^1$ projecting through and slidably in a horizontal slot S in the forward side of the casing section. When this slot in the lower casing section has its lower wall at the same spacing from the grid bottom as the face of the hook tongue $t$ which faces the grid bottom, and the rear perforation $p$ is at a corresponding elevation, this latter perforation cooperates with the slot $s$ to maintain the latch bar B at such a height that the inward face of the hook tongue is at the same elevation as the face of the latch bar which is directed away from the grid bottom.

Consequently, when the latch bar is in the position shown in Figs. 3 and 4, the hook tongue (in the lower section) bears upwardly against this bar, so that this interengagement clamps the grid tightly against the mouth portion of the casing section to which that grid is fitted; when the tongue of this hook is opposite the central portion of the grid, the peripheral flange F of the grid is clamped firmly to the entire mouth end of the casing section to which the grid is fitted. However, when the latch bar is swung horizontally to the position shown in dotted lines in Fig. 3, so that the hook tongue no longer alines vertically with any part of the said bar, the grid is unlatched so that it can readily be detached manually from the casing section.

To retain the latch bar in its operative position, with freedom for the needed horizontal movement and without requiring auxiliary parts either for this bar retention or for permitting the said movement, I desirably form the rear riser wall R of each casing section with an inwardly embossed annular portion $R^1$ contiguous to the said rear perforation $p$, so as to stiffen that part of the rear section wall. Then I provide the latch bar near its forward end with an arm A which continually has its free end portion disposed behind the forward section wall (as shown in Fig. 3) to prevent the latch arm from being slid so far forward as to draw the narrowed rear end of that arm out of the said rear perforation.

This latch arm is so proportioned in length that its arm portion $a$ is just inside the casing section while shoulders 2 (Fig. 7) at the juncture of the narrowed rear end portion 3 of the latch arm with the main part of that arm are substantially contiguous to the embossed portion $R^1$. To place such a latch arm in its operative position, the forward or handle-forming arm end portion 4 is first slid (from the interior of the casing section) through the frontal slot S. Then the rear casing wall R is flexed rearwardly (as shown by dotted lines at $R^2$ in Figs. 3 and 7) sufficiently to allow the rear end of the latch arm to be lowered into the casing section for slipping this rear arm end through the rear perforation $p$ of Fig. 8.

To reduce friction between the latch arm and the hook tongue I desirably form this arm so as to present a longitudinal ridge 6 convexed toward the hook tongue, and likewise form the tongue with longitudinal ridges 7 convexed toward the latch arm, thereby affording engagement along mere points instead of wide surfaces.

To provide ample clearance for both the hook (which preferably has its tongue underhanging the center of the grid to which the hook member is fastened) and the movable latch bar, I desirably construct the heating unit 11 to present two relatively spaced sections (H and $H^1$ in Fig. 3) at opposite sides of the space in which the latch bar and hook are disposed, each section including half of the resistance element E. Moreover, when the two sections of an appliance are substantially counter-parts, the same latch bar and hook elements can be used in both, thereby reducing the manufacturing cost.

To convert the appliance of Figs. 2 and 4 from a sandwich toaster to a waffle iron, the user releases each latch bar of each section (by digitally moving forward arm end $b^1$ from the full-line to the dotted-line position in Fig. 3) so that each sandwich grid can be removed. Then the user substitutes a similarly contoured waffle grid W (Fig. 9) for each of the previous sandwich grids and moves each latch bar to its grid-latching position. Since such a waffle grid is usually a casting, the needed hook 9 may be formed integral with the grid, as shown in Fig. 10.

With the above provisions it will be obvious that the providing of a pair of waffle grids and a pair of toaster grids for interchangeable and readily releasable attachment to the two sections of a single appliance of the recited class permits this appliance to be used with equal effectiveness for waffle baking and for toasting sandwiches. Consequently, the cost of the equipment needed for these two purposes is far less than that of a complete sandwich toaster and of a separate waffle iron.

Moreover, it should be obvious that my provision for firmly latching a grid to a casing section, while permitting this grid to be detached instantly, is equally advantageous for single-grid baking devices; also that the removability of each grid permits a speedy replacing of any damaged grid and also affords ready access to the heating unit.

For further convenience to the user, I desirably dispose my above recited provisions so that the digitally movable end of the latch bar is at the same side of the appliance with the handle 10 on the upper section. However, many changes can obviously be made both in this and other respects without departing either from the spirit of my invention or from the appended claims.

I claim as my invention:

1. An electric toaster or the like comprising an upwardly open casing section having a slot in a side thereof; a grid releasably fitted on the mouth end of the said section, and means for releasably latching the thus fitted grid to the casing section; the said means comprising a latch element depending from the grid, and a latch member supported by and within the casing below the grid; the latch member having a digitably manipulable portion accessible from the exterior of the casing, and being horizontally movable to and from a position in which a part of the latch member bears downwardly on the latch element on the grid which at that time is fitted on the said casing section.

2. An electric toaster or the like comprising an upwardly open casing section having a slot in a side thereof; a grid releasably fitted on the mouth end of the said section, and means for releasably latching the thus fitted grid to the casing section; the said means comprising an arm supported within the said section for rocking movement about a vertical axis and having a handle portion projecting through and slidable in the said slot, and a depending hook upon the grid; the said hook including a hook tongue normally in upward engagement with the said arm; the arm being disposed so that continued movement of the same in the direction faced by the free end of the hook tongue will dispose the arm out of vertical alinement with the tongue to permit the grid to be detached from the casing section.

3. An electric sandwich toaster or the like comprising an upwardly open box-like casing member, a grid detachably fitted upon the mouth of the said member and spanning the said mouth; an electric heating unit disposed in the casing member below the grid; and means operatively interposed between the said grid and the casing member for releasably latching the grid to the said member; the said means comprising a latch-element fast upon and depending from the grid, and a latch member supported by and within the casing and normally interlocked with the said element, the latch member having a digitally operable part projecting through a side of the casing and being movable to and from its said interlocking disposition.

4. A toaster or the like as per claim 3, in which the latch element underhangs the central portion of the grid, so that the said interlocking effectively clamps the grid against all circumferential portions of the mouth of the casing member.

5. A sandwich toaster or the like as per claim 3, in which the casing member is formed to present shoulders engageable by the bar to limit the movement of the bar in relatively opposite directions to the said two positions.

6. A toaster or the like as per claim 3, in which the casing has a horizontal slot in one side of the casing and a pivoting formation on the opposite side of the casing, and in which the latch member is a bar which has one end in engagement with the said pivoting member and its other end portion projecting through the said slot, the length of the slot being greater than the width of the last named end portion of the bar.

7. A sandwich toaster or the like as per claim 3, in which the casing member has its opposite sides provided with perforations through which the two end portions of the said bar respectively project, and in which the bar has shoulder portions respectively adjacent to the inner faces of the said casing sides to prevent a longitudinal sliding of the bar.

8. A toaster or the like as per claim 3, in which the casing has a horizontal slot in one side of the casing and a pivoting formation on the opposite side of the casing, and in which the latch member is a bar which has one end in engagement with the said pivoting member and its other end portion projecting through the said slot; the slot having its ends disposed for engaging the said bar end portion to limit the movement of the bar both toward and away from the latch-element-engaging position of the bar.

9. A toaster or the like as per claim 3, in which the casing has a horizontal slot in one side of the casing and a pivoting formation on the opposite side of the casing, and in which the latch member is a bar which has one end in engagement with the said pivoting member and its other end portion projecting through the said slot; the slot having its ends disposed for engaging the said end portion of the bar to limit the movement of the bar both toward and away from the latch-element-engaging position of the bar; the bar having an arm disposed within the casing and adjacent to the slotted side of the casing and continually presenting a portion of the said arm sufficiently close to the inner face of the said slotted casing side to hold the opposite end of the bar in pivoting engagement with the said pivoting formation.

10. A toaster or the like as per claim 3, in which the latch element has ridges convexed toward the bar and extending transversely of the bar.

11. A toaster or the like as per claim 3, in which the portion of the latching member which normally engages the latch element has a ridge convexed toward the latter member and extending longitudinally of the latching member.

12. An electric toaster or the like, as per claim 1, including an electric heating unit disposed within the said casing member freely spaced downward from the grid and also freely spaced from the said bar and hook tongue.

13. An electric toaster or the like, as per claim 1, including an electric heating unit disposed within the said casing; the said member comprising two main portions disposed respectively at opposite sides of the said bar, and a less tall connecting portion extending below and freely spaced downward from the said bar and hook tongue.

14. An electric toaster as per claim 3, in which the bar has shoulders adjacent to the inner ends of its said end portions and respectively facing the inner faces of the longitudinal sides of the casing member and disposed for preventing longitudinal movement of the bar, and in which the said sides are adapted to be sprung away from each other during the assembling of the toaster to permit the extending of the first named bar end portion through the said perforation after the other end portion of the bar has been slid through the said slot from the interior of the casing member.

15. An electric toaster or the like comprising an upwardly open and rectangular casing member; a grid spanning and seated upon the mouth of the said member and having a peripheral portion thereof slidably fitted into the said mouth, a hook member fast upon and depending from the central portion of the grid and including a tongue spaced downward from the grid and extending longitudinally of the grid; one longitudinal side of the casing having an inwardly embossed annular portion provided with a central perforation, and the opposite casing side having a horizontal slot opposite the said perforation; and a bar extending below the grid within the casing between the said sides and normally bearing downwardly on the said hook tongue to latch the grid to the said casing member, the bar having one end portion thereof projecting through and adapted to rock horizontally in the said perforation; the bar having its other end portion slidable in the said slot and projecting beyond the slot to serve as a handle whereby the bar can be rocked.

16. An electric toaster or the like comprising an upwardly open casing section having a slot in a side thereof; a toaster grid and a waffle grid interchangeably and releasably fitted on the mouth end of the said section; and means for latching the thus fitted grid to the casing section, the said means comprising an arm supported within the said section for rocking movement about a vertical axis and having a handle portion projecting through and slidable in the said slot, and a depending hook on the grid including a hook tongue normally in upward engagement with the said arm; the arm being disposed so that continued movement of the same in the direction faced by the free end of the hook tongue will dispose the arm out of vertical alinement with the tongue to permit the grid to be detached from the casing section; either the hook tongue and the arm portion normally engaging that tongue, or both thereof, being convexed toward the other to reduce the area of engagement therebetween.

BERNHART A. BENSON.